United States Patent [19]

Kehrer et al.

[11] Patent Number: 4,768,584
[45] Date of Patent: Sep. 6, 1988

[54] DEVICE FOR COOLING GASES DERIVING FROM AMMONIA SYNTHESIS

[75] Inventors: Wolfgang Kehrer, Berlin; Helmut Lachmann, Gottfried-von-Cramm-Weg; Konrad Nassauer, Berlin, all of Fed. Rep. of Germany

[73] Assignee: Borsig GmbH, Berlin, Fed. Rep. of Germany

[21] Appl. No.: 119,849

[22] Filed: Nov. 12, 1987

[30] Foreign Application Priority Data

Dec. 13, 1986 [DE] Fed. Rep. of Germany ....... 3642673

[51] Int. Cl.4 .............................................. F28D 7/10
[52] U.S. Cl. .................................... 165/140; 165/101; 165/103
[58] Field of Search ................. 165/140, 161, 101, 103, 165/100, 141, 102

[56] References Cited

U.S. PATENT DOCUMENTS

| | | | |
|---|---|---|---|
| 1,710,712 | 4/1929 | Reavis | 165/140 |
| 2,382,255 | 8/1945 | Pyzel | 165/140 |
| 2,898,384 | 8/1959 | Viriot | 165/140 |
| 4,576,225 | 3/1986 | Nassauer | 165/140 |

Primary Examiner—James C. Yeung
Attorney, Agent, or Firm—Max Fogiel

[57] ABSTRACT

Device for cooling gases deriving from ammonia synthesis. The device consists of pipes accommodated in an interior space. The space is subjected to a heat-absorption medium and surrounded by a cylindrical mantle. The pipes are secured in a pipe floor and communicate with a gas-intake chamber and a gas-outlet chamber. When an ammonia-production plant has several reactors, a single gas-cooling device has up to now been associated with each. The new device is intended to decrease the engineering expenses involved in cooling the gases in such plants. A gas-intake chamber and a gas-outlet chamber is positioned at each of the two opposite ends of the jacket. Straight pipes are associated with each chamber. The pipes are adjacent and the gas flows through them in opposite directions.

4 Claims, 2 Drawing Sheets

DEVICE FOR COOLING GASES DERIVING FROM AMMONIA SYNTHESIS

BACKGROUND OF THE INVENTION

The invention concerns a device for cooling gases deriving from ammonia synthesis.

A device of this type is known from German Pat. No. 3 049 409. A gas-intake chamber is accommodated inside a gas-outlet chamber and communicates with clusters of pipes through insertion pipes. The system accordingly takes the relationships (nitrification) that occur during the cooling of gases deriving from ammonia synthesis into account.

Improving the yield of ammonia in ammonia plants by employing several reactors that the mixture of reaction gases flows through in sequence is known (U.S. Pat. No. 4,510,123). A heat-removal boiler is positioned upstream and downstream of the last reactor. The necessity of several heat-removal boilers in conjunction with their associated controls and pipelines makes a multi-reactor system considerably expensive.

SUMMARY OF THE INVENTION

The object of the invention is to design a device of the aforesaid genus in relation to the conditions prevailing in the cooling of gases deriving from ammonia synthesis such that the engineering expense involved in the exploitation of heat removal in a plant involving several reactors will be decreased.

This object is attained in a device in accordance with the invention by means of the characteristics recited in the body of claim 1. The design of the device in accordance with the invention combines two heat-removal boilers into a single piece of equipment, which also necessitates only one single pipeline system at the water end. The reactor intakes and outlets can communicate directly with a heat exchanger in accordance with the invention in such a way that the reactors will communicate directly through the heat exchanger, and no gas lines will be necessary between the reactors. Every gas-intake pipe end is surrounded by four gas-outlet pipe ends with a gas-outlet temperature that is low enough to have a cooling effect on the gas-intake pipe ends. This allows the temperatures of the material that the gas-intake pipe end is made out of to be below that at which the steel will nitrify. Thus, since the problem is nitrification of the pipe material has been eliminated, ferritic steel, which is more resistant to water-end tension-cracking corrosion than nitrification-resistent austenitic steel is, can be employed.

The bypass recited in claim 2 and in itself known from German Pat. No. 2 846 455 will prevent the cooled gas from attaining too low a temperature upstream of where it enters the two reactors in that a prescribed amount of uncooled gas is mixed in with it.

One embodiment of the invention will now be described with reference to the drawing, wherein

DESCRIPTION OF THE PREFERRED EMBODIMENT

The illustrated heat exchanger is employed to cool gas that is converted in the reactors in an ammonia-production plant. The heat exchanger comprises an outer cylindrical jacket 1 that encloses an interior space 2 and is provided with a connection 3 for supplying and another connection 4 for removing a heat-absorption medium. The heat-absorption medium is water that is supplied through connection 3, is vaporized by heat absorption, and leaves through connection 4 in the form of a mixture of water and steam.

Supply connection 3 communicates through a downpipe, and removal connection 4 through a riser, with a steam drum. The steam drum, downpipe, and riser are for simplicity's sake not illustrated.

Figure 1:
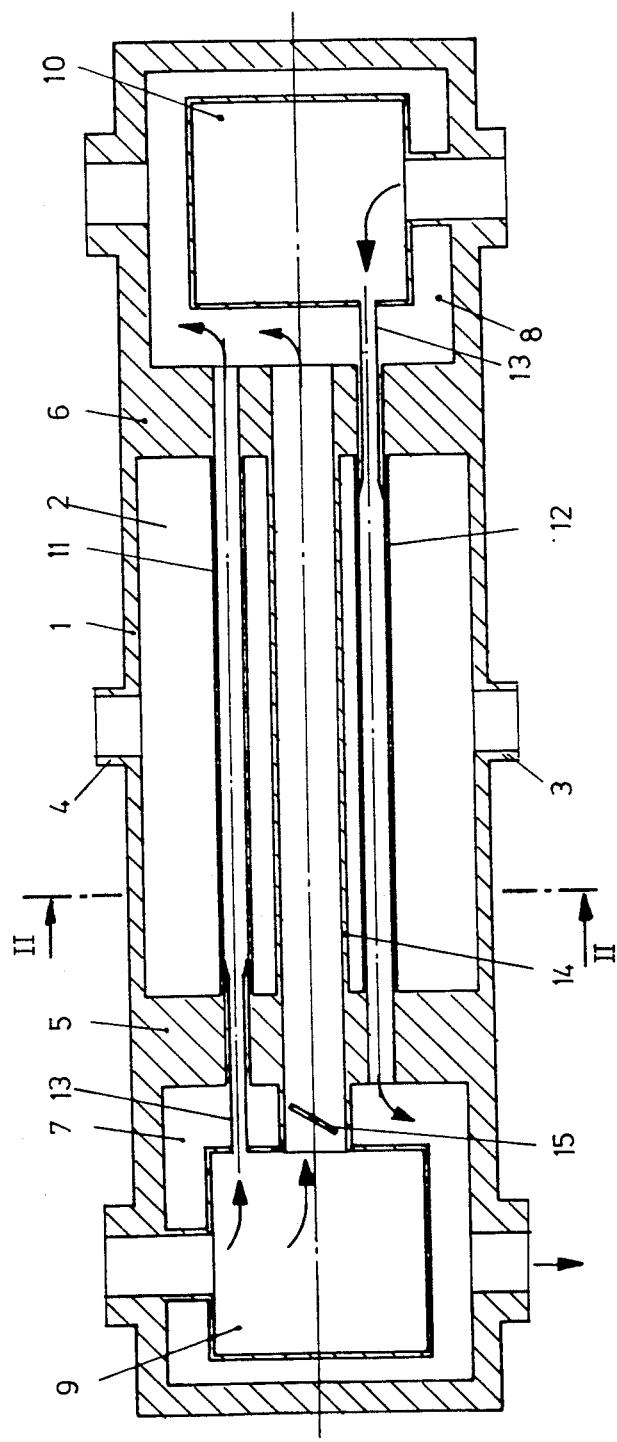
FIG. 1 is a schematic longitudinal section through a device in accordance with the invention.
Figure 2:
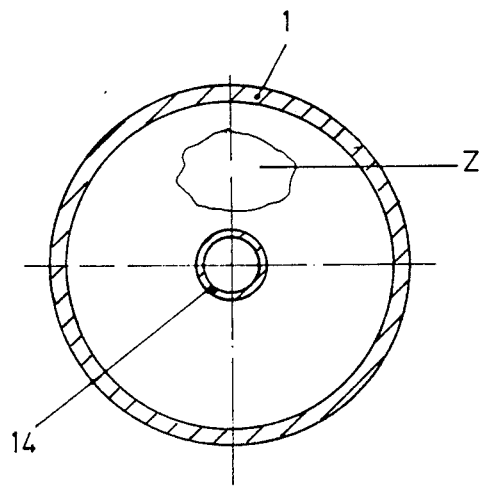
FIG. 2 is a section along the line II—II in FIG. 1.

Welded into jacket 1 are two pipe floors 5 and 6 that demarcate the ends of interior space 2. Adjacent to the pipe floor 5 and 6 at each end of jacket 1 is a gas-outlet chamber 7 and 8. Inside each gas-outlet chamber 7 and 8 and at a distance from pipe floors 5 and 6 is a gas-intake chamber 9 and 10. The gas-intake chamber 9 illustrated on the left side of FIG. 1 communicates with one reactor, and the gas-intake chamber 10 on the right side communicates with another reactor in the ammonia-production plant. The gas-outlet chamber 8 on the right communicates with the intake into the second reactor and the gas-outlet chamber 7 on the left communicates with a line that leads to further-processing equipment. The reactors communicate directly with gas-intake chambers 9 and 10 and with one gas-outlet chamber 8. The illustrated heat exchanger accordingly constitutes a direct connection between two reactors in an ammonia-production plant.

Accommodated in the interior space 2 surrounded by jacket 1 and laterally demarcated by pipe floors 5 and 6 are straight pipes 11 and 12. The number of pipes 11 equals that of pipes 12. Each pipe 11 and 12 communicates with one gas-intake chamber 9 or 10 and with one gas-outlet chamber 7 or 8. Insertion pipes 13 that are insulated on the outside connect the particular gas-intake chambers 9 and 10 to the intake ends of pipes 11 and 12. Insertion pipes 13 extend into pipes 11 and 12 and, since they have—downstream of the pipe floors 5 and 6 in the direction traveled by the gas—an expansion, rest against the inner surfaces of the pipes.

Figure 3:
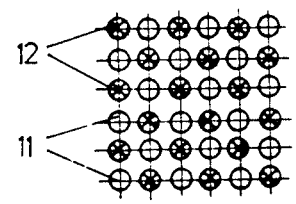
FIG. 3 is a larger-scale detail of the area Z in FIG. 2.

Pipes 11 and 12 are displaced inside interior space 2 in such a way that pipes 11 alternate with pipes 12. The situation is illustrated in FIG. 3, which is a detail of the pipe area. Pipes 11 are represented by the empty circles and pipes 12 by the circles inscribed with a cross. It will be evident that a pipe 11 is always adjacent to a pipe 12 along the two perpendicular directions in which the pipes 11 and 12 are closest together. The gas flows through adjacent pipes in opposite directions.

A gas-access pipe 14 is positioned, preferably along the longitudinal axis of jacket 1, parallel to pipes 11 and 12 and connects the left-hand gas-intake chamber 9 that communicates with the first reactor to the right-hand gas-outlet chamber 8 that communicates with the second reactor. A choke 15 is accommodated in gas-access pipe 14. Gas-access pipe 14 functions as a bypass to pipes 11. Depending on the position of choke 15, a larger or smaller portion of hot gas can be mixed in with the cooled gas in pipes 11 in order to maintain constant the temperature of the gas at the intake into the second reactor.

I claim:

1. An arrangement for cooling gases derived from ammonia synthesis comprising: two pipe means accommodated in an interior space subjected to a heat-absorption medium surrounding said pipe means; a cylindrical jacket surrounding said pipe means; pipe base means for securing said pipe means; a gas-intake chamber and a gas-outlet chamber communicating with each of said two pipe means; said gas-outlet chamber being separated from said interior space by said pipe base means; said jacket having two opposite ends, said gas-intake chamber and said gas-outlet chamber being positioned at each of said two opposite ends of said jacket; said gas-intake chamber having intake pipes comprising first one of said two pipe means, and said gas-outlet chamber having outlet pipes comprising a second one of said two pipe means, said intake pipes and said outlet pipes running adjacent to each other, gas in said intake pipes flowing in a direction opposite to flow of gas in said outlet pipes, gas to be cooled after a first treatment passing through said first pipe means and after being cooled through said first pipe means and receiving a second treatment said gas is passed through said second pipe means for further cooling, said two pipe means comprising two heat exchangers within said interior space; said pipe base means comprising two bases, each of said bases being connected to one gas-outlet chamber, a gas-inlet chamber connected to one of said two pipe means being located within the gas-outlet chamber of the other pipe means; cold pipe ends being arranged adjacent to hot inlet pipe ends in said bases for the cold ends to receive heat transmitted from said hot ends to said bases and thereby maintain the temperature of said bases at a predetermined low level.

2. An arrangement as defined in claim 1, including a gas-access pipe having a choke, one gas-intake chamber communicating with said gas-outlet chamber through said gas-access pipe, said one gas intake chamber and said outlet chamber being positioned at opposite ends of said jacket.

3. An arrangement for cooling gases derived from ammonia synthesis comprising: two pipe means accommodated in an interior space subjected to a heat-absorption medium surrounding said pipe means; a cylindrical jacket surrounding said pipe means; pipe base means for securing said pipe means; a gas-intake chamber and a gas-outlet chamber communicating with each of said two pipe means; said gas-outlet chamber being separated from said interior space by said pipe base means; said jacket having two opposite ends, said gas-intake chamber and said gas-outlet chamber being positioned at each of said two opposite ends of said jacket; said gas-intake chamber having intake pipes comprising a first one of said two pipe means, and said gas-outlet chamber having outlet pipes comprising a second one of said two pipe means, said intake pipes and said outlet pipes running adjacent to each other, gas in said intake pipes flowing in a direction opposite to flow of gas in said outlet pipes, gas to be cooled after a first treatment passing through said first pipe means and after being cooled through said first pipe means and receiving a second treatment said gas is passed through said second pipe means for further cooling, said two pipe means comprising two heat exchangers within said interior space; said pipe base means comprising two bases, each of said bases being connected to one gas-outlet chamber, a gas-inlet chamber connected to one of said two pipe means being located within the gas-outlet chamber of the other pipe means; cold pipe ends being arranged adjacent to hot inlet pipe ends in said bases for the cold ends to receive heat transmitted from said hot ends to said bases and thereby maintain the temperature of said bases at a predetermined low level; said intake pipes alternating with said outlet pipes, the number of said intake pipes being equal to the number of outlet pipes; a gas access pipe having a choke, one gas-intake chamber communicating with said gas-outlet chamber through said gas-access pipe, said one gas intake chamber and said outlet chamber being positioned at opposite ends of said jacket; said gas access pipe comprising a bypass to said first pipe means, an amount of hot gas depending on the position of said choke being mixable with cooled gas in said first pipe means to maintain constant the temperature of the gas for said second treatment.

4. An arrangement for cooling gases derived from ammonia synthesis comprising: two pipe means accommodated in an interior space subjected to a heat-absorption medium surrounding said pipe means; a cylindrical jacket surrounding said pipe means; pipe base means for securing said pipe means; a gas-intake chamber and a gas-outlet chamber communicating with each of said two pipe means; said gas-outlet chamber being separated from said interior space by said pipe base means; said jacket having two opposite ends, said gas-intake chamber and said gas-outlet chamber being positioned at each of said two opposite ends of said jacket; said gas-intake chamber having intake pipes comprising a first one of said two pipe means, and said gas-outlet chamber having outlet pipes comprising a second one of said two pipe means, said intake pipes and said outlet pipes running adjacent to each other, gas in said intake pipes flowing in a direction opposite to flow of gas in said outlet pipes, gas to be cooled after a first treatment passing through said first pipe means and after being cooled through said first pipe means and receiving a second treatment said gas is passed through said second pipe means for further cooling, said two pipe means comprising two heat exchangers within said interior space; said pipe base means comprising two bases, each of said bases being connected to one gas-outlet chamber, a gas-inlet chamber connected to one of said two pipe means being located within the gas-outlet chamber of the other pipe means; cold pipe ends being arranged adjacent to hot inlet pipe ends in said bases for the cold ends to receive heat transmitted from said hot ends to said bases and thereby maintain the temperature of said bases at a predetermined low level; said intake pipes alternating with said outlet pipes, the number of said intake pipes being equal to the number of outlet pipes; a gas access pipe having a choke, one gas-intake chamber communicating with said gas-outlet chamber through said gas-access pipe, said one gas intake chamber and said outlet chamber being positioned at opposite ends of said jacket; said gas access pipe comprising a bypass to said first pipe means, an amount of hot gas depending on the position of said choke being mixable with cooled gas in said first pipe means to maintain constant the temperature of the gas for said second treatment; insertion pipes insulated on the outside and connecting a gas intake chamber to respective ends of said first and second pipe means, said insertion pipe extending into said two pipe means and resting against inner surfaces of said two pipe means.

* * * * *